United States Patent [19]
Klein

[11] Patent Number: 5,324,459
[45] Date of Patent: Jun. 28, 1994

[54] PROCESS AND APPARATUS FOR HOLDING THE TEMPERATURE OF THE EXTRUDANT OF A SCREW EXTRUDER CONSTANT

[75] Inventor: Heinz Klein, Pattensen, Fed. Rep. of Germany

[73] Assignee: Paul Troester Maschinenfabrik, Hanover, Fed. Rep. of Germany

[21] Appl. No.: 29,901

[22] Filed: Mar. 11, 1993

[30] Foreign Application Priority Data

Mar. 13, 1992 [DE] Fed. Rep. of Germany ....... 4208284

[51] Int. Cl.⁵ ............................................ B29C 47/92
[52] U.S. Cl. .................................... 264/40.5; 264/40.6;
264/40.7; 264/211.21; 264/349; 425/144;
425/145; 425/208; 425/382.4
[58] Field of Search ............... 264/40.5, 40.1, 349,
264/40.6, 40.7, 211.21; 425/144, 145, 208,
382.4; 366/80, 90

[56] References Cited

U.S. PATENT DOCUMENTS

| | | | |
|---|---|---|---|
| 3,981,658 | 9/1976 | Briggs | 425/208 |
| 4,213,747 | 7/1980 | Friedrich | 425/144 |
| 4,214,859 | 7/1980 | Anders | 425/382.4 |
| 4,735,565 | 4/1988 | Capelle | 425/208 |
| 4,759,890 | 7/1988 | Kroksnes | 425/145 |
| 4,901,635 | 2/1990 | Williams | 425/208 |
| 5,141,426 | 8/1992 | Capelle | 366/90 |
| 5,145,352 | 9/1992 | Capelle et al. | 425/382.4 |
| 5,147,198 | 9/1992 | Capelle | 366/80 |
| 5,190,771 | 3/1993 | Baumgarten | 425/208 |
| 5,215,374 | 6/1993 | Meyer | 425/145 |

FOREIGN PATENT DOCUMENTS

2758266  6/1979  Fed. Rep. of Germany ... 425/382.4

*Primary Examiner*—Jeffery Thurlow
*Attorney, Agent, or Firm*—Robert E. Burns; Emmanuel J. Lobato

[57] ABSTRACT

A screw extruder having a cylinder, an extrusion head, a screw in the cylinder and a motor for driving the screw in rotation has insert members which extend into the cylinder to effect plastification and homogenization of the material being extruded. The web of the screw is provided with annular recesses into which the insert members project. Some of the insert members are stationary, in the form of pins projecting radially into the cylinder, while others are movable so as to vary the extent of their projection into the cylinder. The movable insert members may be pins extending radially into the cylinder and movable radially, rotatable threaded pins extending tangentially into the cylinder, rotatable pins extending tangentially into the cylinder and having non-circular portions in the cylinder, or sector-shaped discs which are movable pivotally. Actuators for the movable insert members are controlled by a processor which compares measured output temperature of the extrudant in the extruder head with a preselected temperature.

8 Claims, 5 Drawing Sheets

PROCESS AND APPARATUS FOR HOLDING THE TEMPERATURE OF THE EXTRUDANT OF A SCREW EXTRUDER CONSTANT

FIELD OF INVENTION

The invention relates to a process for holding constant the discharge temperature of the extrudate of a screw extruder, which is provided with slidable or rotatable members which project into the interior of the extruder at locations in which the web of the screw of the extruder is provided with annular interruptions, a screw extruder for carrying out such process and a processor for controlling such screw extruder.

BACKGROUND OF THE INVENTION

For two decades pin cylinder screw extruders are known in the rubber and plastic industry (DE 31 50 719) in order to be able to plasticize and disintegrate better and more rapidly materials which are difficult to process. In-the course of the these decades, screw extruders have been ever more improved. Stationary inserted pins have a form which prevents pin breakage. Pin breakage warning devices (DE 32 21 472) and forewarning devices (DE 3 502 437) which respond to the elastic bending of the pins have been developed. In order to avoid the need of individually disassembling the pins when the extruder is to be cleaned and the screw is to be removed from the extruder, hydraulic (DE 35 03 911) and mechanical (DE 35 06 424) drives have been developed with which the pins can be shifted out of their working positions and into withdrawn positions. Through the introduction of additional per se known working means, as for example torpedo pieces inserted in the screw, shearing parts and through grooves cut in the cylinder, further improvement of the plasticizing of the extrudant is attained.

It is an old problem in the extruder technique to find optimal working conditions for the discharge rate, the discharge temperature, the degree of plastification and the discharge pressure. If a good degree of plastification for a certain desired discharge quantity per unit time has been found, and also the temperature of the extrudate has been brought to a value which is favorable for further working of the extrudate, these favorable values cannot be retained when, for example, the rate of rotation of the extruder screw is altered in order further to improve the degree of plastification. Also the discharge quantity per unit time cannot be altered without also altering the degree of plastification and the temperature of the extruded material. This has the result that with a favorable adjustment of the extruder, optimal adjustment of the following machines in the production line cannot be obtained, because, for example, the extrusion temperature is too high or the extrusion quantity per unit time cannot attain the desired optimum value.

SUMMARY OF THE INVENTION

The invention overcomes the disadvantages of the state of the art. It is an object of the invention to be able to vary the quantity of discharge per unit time within wide limits while maintaining a constant predetermined temperature.

The invention achieves this objective through the use of screw extruders of the afore-mentioned kind by making the members inserted into the screw extruder adjustable in the extent of their insertion according to a variation of the extrusion temperature.

This adjustment of the adjustable members in dependence on the discharge temperature of the extrudate provides the possibility of varying the output quantity per unit time in wide limits without undesired plastification of the extrudate and without the temperature of the extrudant upon discharge from the extruder being altered. This brings a considerable advantage for following machines arranged in a production line. These can now be adjusted for optimal operating parameters and their speed of operation can be varied within wide limits because it is possible to vary the output quantity per unit time within wide limits while maintaining the temperature and degree of plastification in the extruder constant.

In the first place, the adjustable members of a pin cylinder extruder can be movable radially as well as also tangentially to vary the extent of their projection into the interior of the extruder cylinder. But also, other members extending into the interior of the extruder cylinder are possible, for example, circular disk sectors.

To obtain the desired working of the material to be extruded, it is advantageous when a part of the members is held stationary, in a fixed predetermined position for the desired plastification and homogenizaton of the material during the work process and when another part of the members, during the work process, are adjusted as to the depth of their insertion into the extruder cylinder according to the output temperature of the extrudant exceeding or falling below the desired value.

It has been found to be advantageous when stationary members as well as also members movable during the working process are arranged in a common plane, advantageously in the manner that the adjustable members are arranged between two or three fixed members.

In order to reduce the loading of the members, it is advantageous when the depth of insertion is adjusted differently in different radial planes, advantageously in the manner that the depth of insertion is less in radial planes near the intake than in radial planes remote from the intake.

For carrying out this process, there is used a screw extruder comprising a cylinder in which there is a rotatable screw which has in its web annular recesses into which radially project members which are adjustably supported in or on the cylinder. In accordance with the invention, the members which project into the extruder cylinder are adjustable by adjustment mechanism controlled by a control system having an input connected with a temperature sensor of the extrudant output temperature while an output is connected with at least one motor for adjustment of the adjustable members and which has a desired value/actual value comparator.

Advantageously, the extrusion apparatus is formed so that a part of the members are set at a predetermined depth for the desired degree of plastification and homogenization and that another part of the members are adjusted by means of a control system during the working process, whereby an input of the control system is connected with a temperature sensor of the output temperature of the extrudate while an output of the control system is connected with at least one motor for adjusting the adjustable members and the control system comprises a desired value/actual value comparator.

The adjustment mechanism for adjusting the adjustable members can, for example, be electric motors, hydraulic motors or hydraulic-cylinder-piston units, among others.

In an embodiment providing especially fine control of the processing of the material to be extruded, several motor driven adjustment devices for the adjustable members in different planes are controlled by different control signals.

For carrying out the process, there is used a processor for the control of a screw extruder, such processor having inputs connected with a preselector for the rate of rotation of the screw, a preselector for the desired extrudate temperature, and a sensor for the actual extrudant temperature, while outputs of the processor are connected to the motor for driving the screw, as well as to adjustment motors for the adjustable members during the work process in dependence on the extrudant discharge temperature.

BRIEF DESCRIPTION OF THE DRAWINGS

The invention will be more clearly understood from the following description of preferred embodiments shown schematically in the accompanying drawings in which.

DESCRIPTION OF PREFERRED EMBODIMENTS

Figure 1:
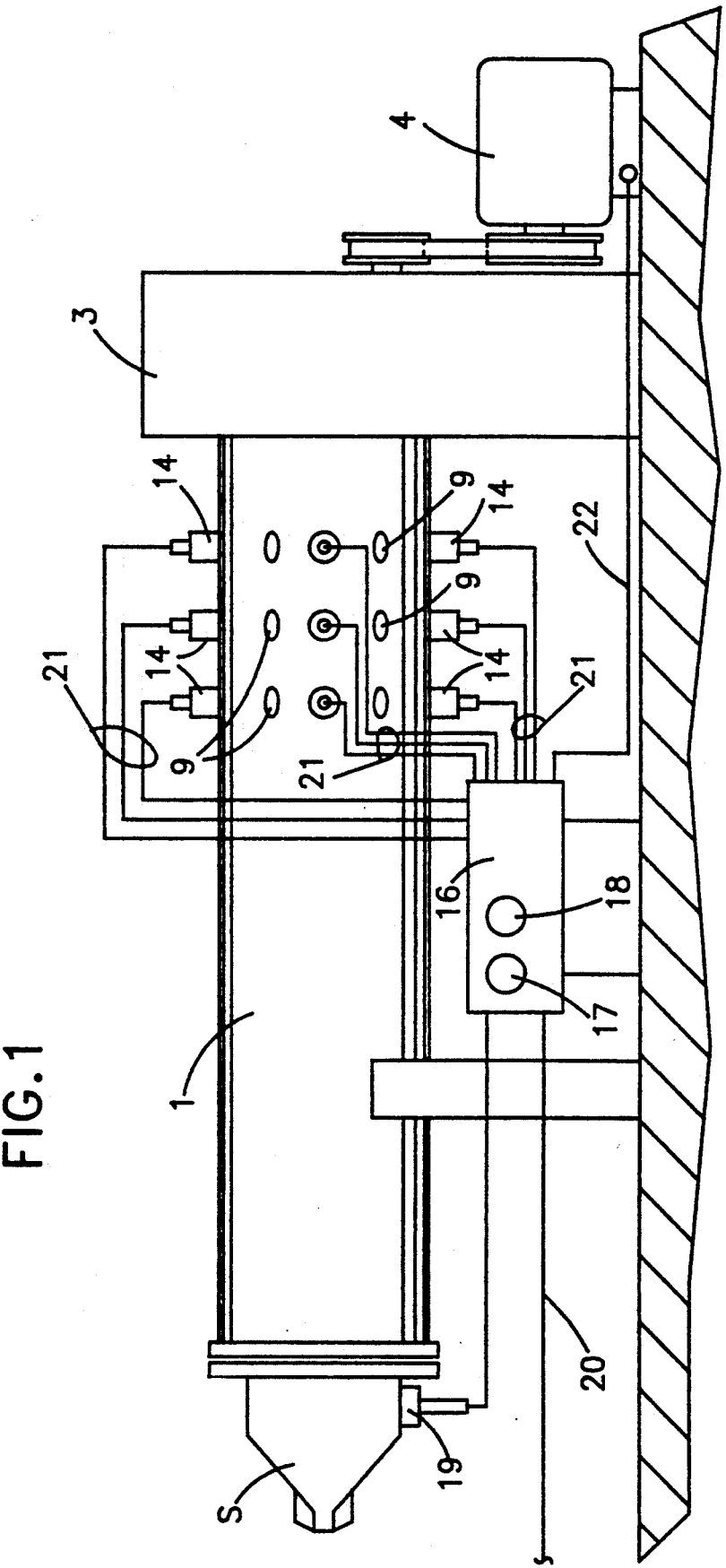
FIG. 1 is a schematic side elevation of an extruder in accordance with the invention.

The pin cylinder extruder comprises a cylinder 1 in which a screw 2 is rotatably arranged, a drive 3 and a motor 4 for driving the screw as well as an ejection head 5. The cylinder 1 is provided with a cylinder bushing 7 in its interior. Radial bores 6 extend through the wall of the cylinder and through the cylinder bushing 7. In these radial bores there are inserted non-adjustable pins 8, which are held in their non-adjustable position by retaining screws 9. The pins 8 have portions 10 which project into the interior of the cylinder and through which plastification of the extrudant is effected. On these parts 10 there are integral parts 11 of larger diameter which have the same diameter as bores in the cylinder bushing 7. Aligned bores in the wall of the cylinder 1 are larger so that variable expansion of the cylinder bushing 7 and the cylinder 1 does not have any effect on the pins. Each pin 8 has finally an end part of still greater diameter which with its shoulder bears on the shoulder 12 in the bore 6. The shoulder of the pin is pressed against the shoulder 12 by the retaining screw 9 so that it remains slidable. Thereby movement of the pin 8 in a radial direction is not possible, while a sliding on the shoulder 12 and on the end face of the screw 9 is possible.

Figure 2:
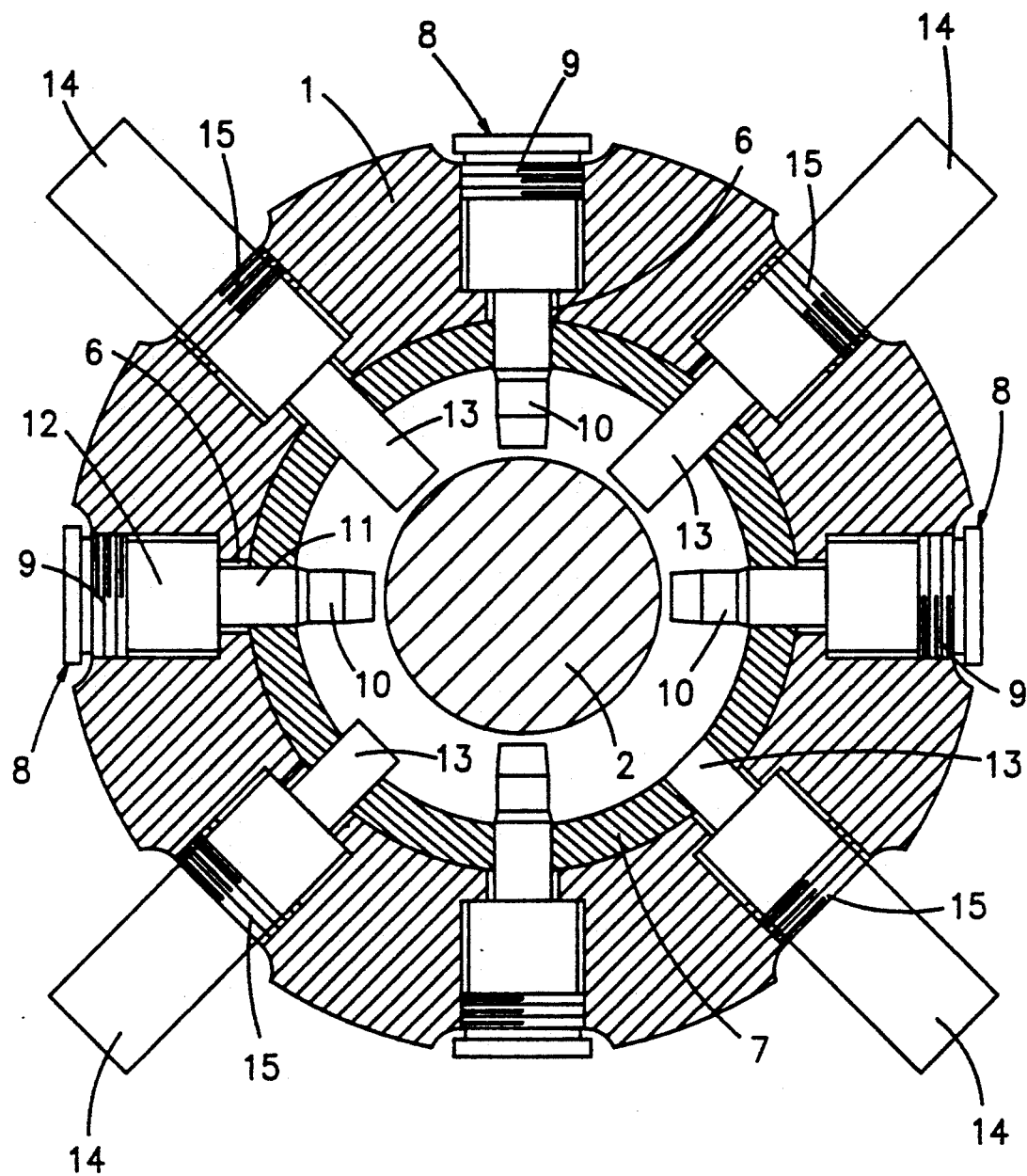
FIG. 2 is a cross-sectional view of one embodiment.

Between these pins 8 there are provided pins 13, which are displaceable by means of displacement devices accommodated in housings 14. Each housing 14 has on its exterior a thread 15 which screws into an inner thread which is the same as the threads for the retaining screws 9 of the pins 8. The housing 14 is screwed into the inner thread until its end face abuts the shoulder 12. In the embodiment illustrated in FIG. 2, both upper pins 13 are shown fully inserted into the interior of the cylinder 1 while the lower left pin 13 is inserted halfway and the lower right pin is not inserted into the interior of the cylinder. The pin shifting device is so arranged inside the housing 14 that displacement of the pin shifting device relative to the housing by reason of differential expansion between the cylinder bushing 7 and the cylinder 1 is possible.

The control for the pin 13 shifting devices accommodated in the housings 14 is effected by a processor 16. The processor has a setting device 17 for pre-setting the temperature and a setting device 18 for the speed of rotation of the screw. An input is connected with a temperature sensor 19 accommodated in the extrusion head 5. There is also a line 20 for the remote control of the speed of rotation. Outputs of the processor are connected by lines 21, with the different shifting devices for the pins 13. Further, a line 22 leads from an output of the processor to the motor 4.

In this manner, the output quantity per unit time can be varied in wide limits without influencing the output temperature and, likewise, the temperature can be varied with a constant output quantity per unit time by varying the depth of insertion of the pins 13 in the interior of the cylinder, in case this is advantageous for following processes.

Figure 3:
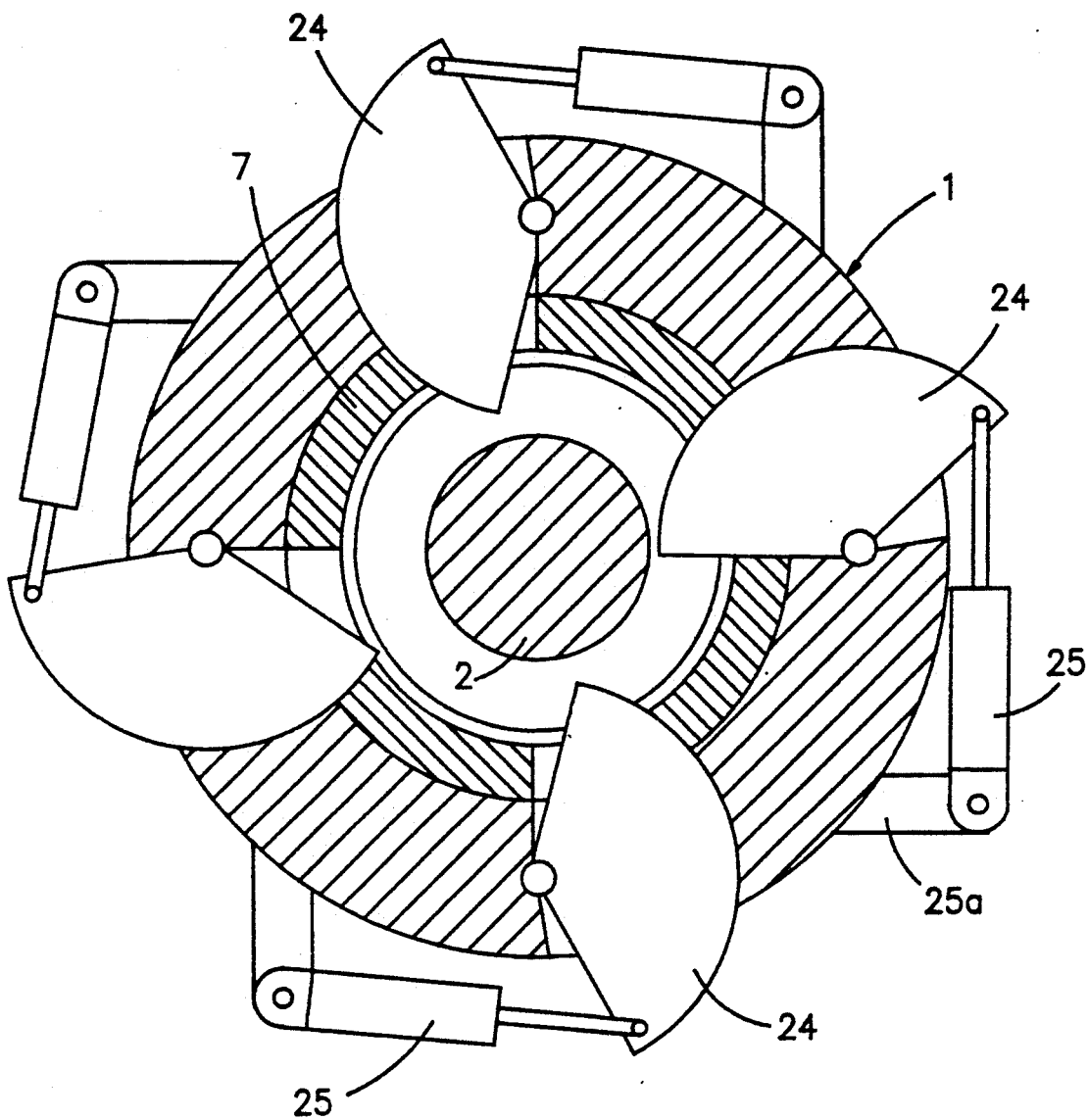
FIG. 3 is a cross-sectional view of another embodiment.

In the embodiment shown in FIG. 3 sector-shaped disks 24 swingable about axes 23 have inner portions insertable in the cylinder 1 and outer portions, outside the cylinder 1, pivotally connected with one end of a hydraulic cylinder-piston unit 25, of which the other end is connected with an arm 25a on the cylinder. By means of the cylinder-piston units, the sector-shaped disks 24 can be swung about their pivots 23 to vary the extent of insertion of the disks into the interior of the cylinder. As shown in FIG. 3, the right-hand sector-shaped disk 24 is fully projected into the annular interruption in the web of the extruder screw, the left-hand sector-shaped disk is fully withdrawn, and the upper and lower sector-shaped disks are inserted halfway.

Figure 4:
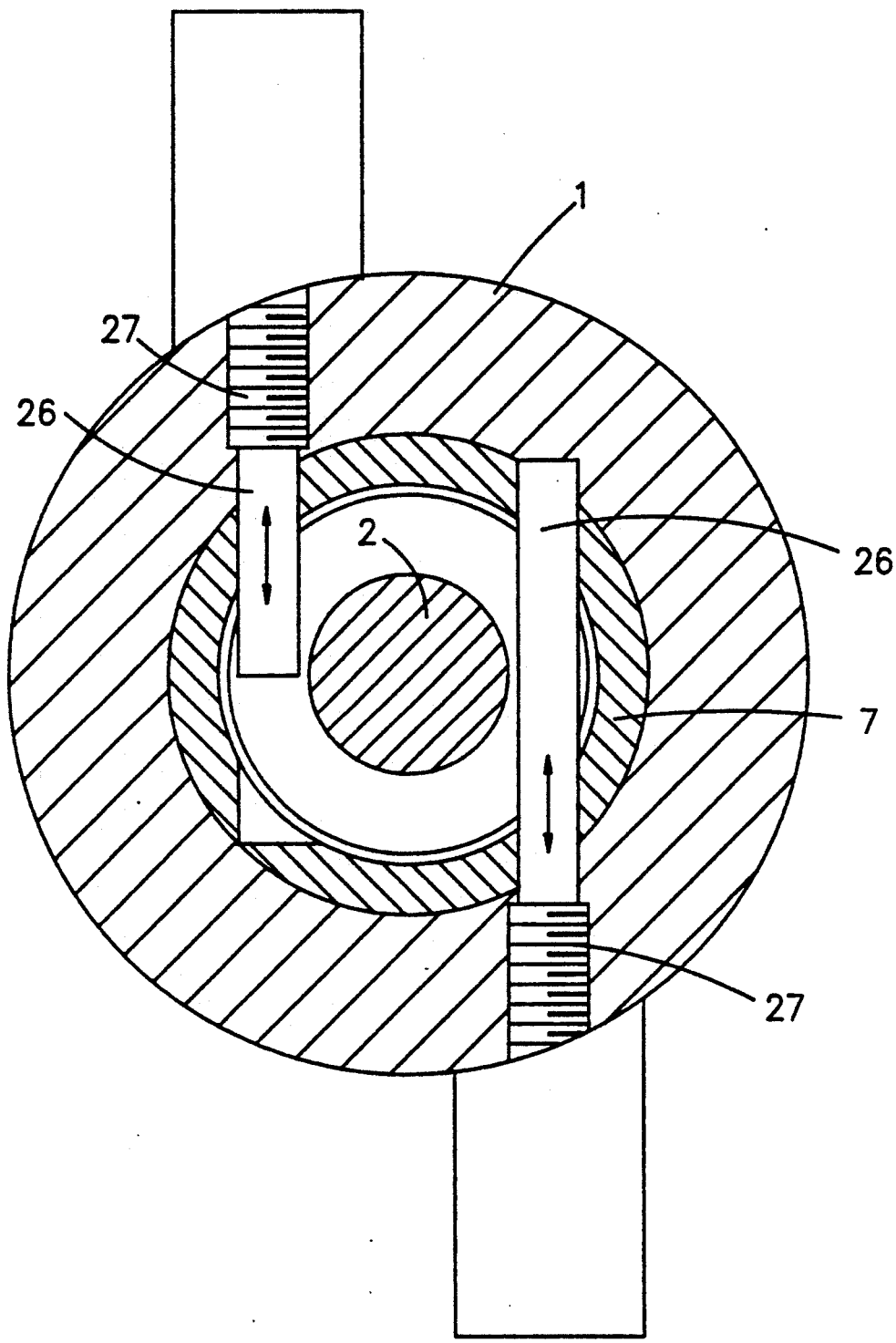
FIG. 4 is a cross-sectional view of a further embodiment.

In the embodiment shown in FIG. 4, the adjustable members are formed as pins 26, which are movable tangentially into the interior of the cylinder 1. The pins 26 have threaded portions 27 received in threaded bores in the cylinder wall. The pins are rotatable by means of rotary motors so as to project more or less deeply into the interior of the cylinder.

Figure 5:
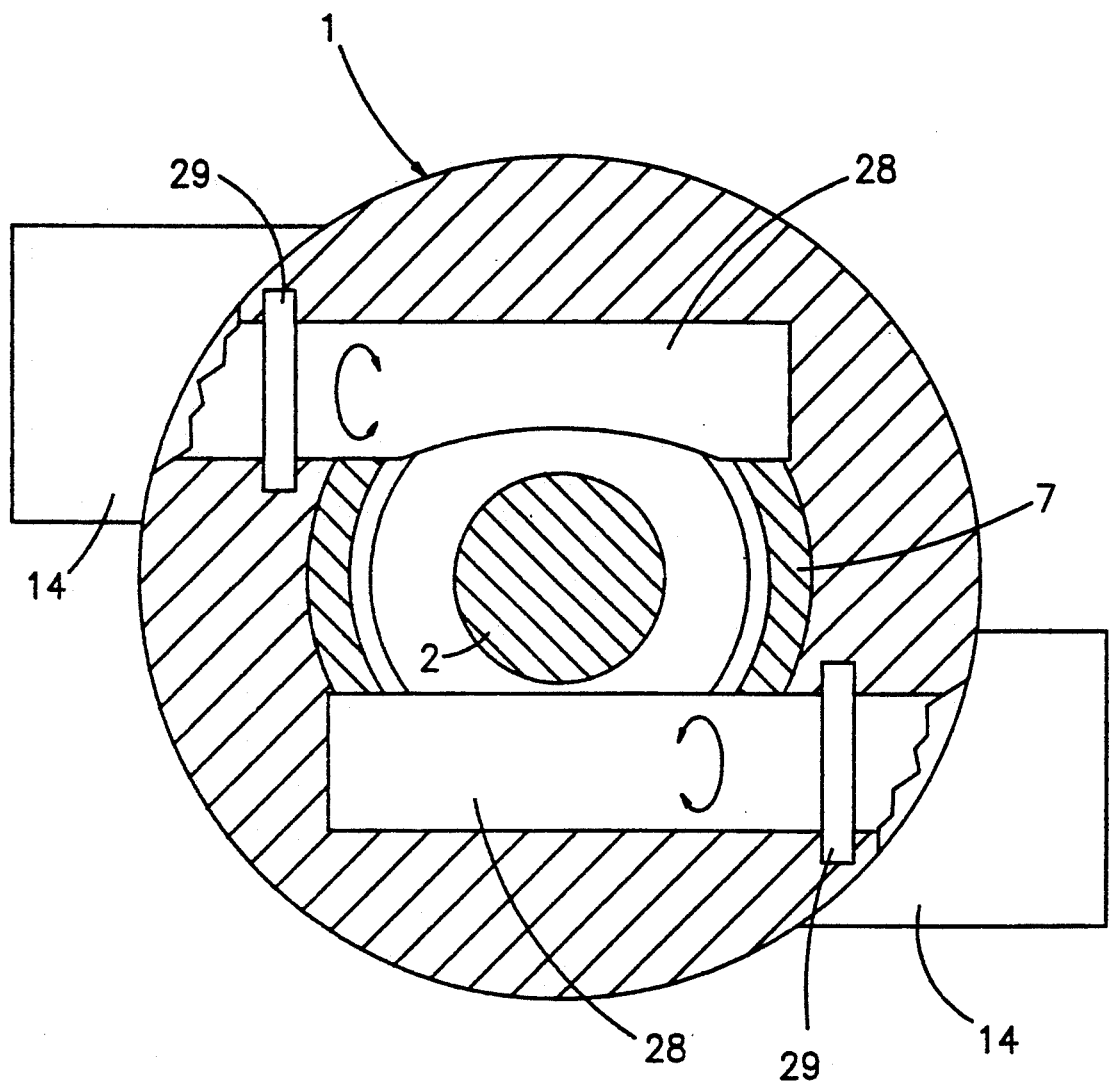
FIG. 5 is a cross-sectional view of still another embodiment.

In the embodiment shown in FIG. 5, pins 28, which extend tangentially into the interior of the cylinder 1, are held against lengthwise movement by collars 29. The portions of the pin inside the cylinder are non-circular so that the effective extent of projection of the pins in the interior of the cylinder is variable by rotary movement of the pins. As shown in FIG. 5, the upper pin has minimum effective insertion in the interior of the cylinder while the lower pin has a maximum effective insertion. The pins are rotatable by displacement units in the housings 14.

Thus a possibility of varying the output quantity per unit time without varying the degree of plastification and without varying the output temperature satisfies a long-existing need in the pertinent industry as it is now possible to control subsequent machines in the production line more easily with optimum parameters.

The described temperature—depth of pin insertion—rate of rotation of the screw control opens the possibility of feeding in the desired values for the temperature and output quantity per unit time, whereupon the processor determines the depth of insertion of the pin elements and the rate of rotation of the screw.

A further advantage of the inclusion of a processor is that it is possible to store in the processor process parameters with which, under consideration of the given and the attained parameters, the carrying out of the process can be controlled.

I claim:

1. A process for controlling a screw extruder for extruding plastic compositions in order independently to control the degree of plastification and homogenization of the composition, the output temperature of the composition and the output quantity per unit time, said extruder comprising a cylinder having a cylindrical wall, an extrusion head, a screw rotatable in said cylinder, a motor driving said screw in rotation in said cylinder to force extrudate to and through said extrusion head and means for controlling the speed of said motor, said screw having a helical flight with at least one annular interruption therein, and a plurality of insert members insertable through said wall of said cylinder and into the interior of said cylinder at a location of said annular interruptions in said fight of said screw, at least one of said insert members being stationary and at least one of said insert members being movable to vary the degree of insertion of said movable insert members in the interior of said cylinder, actuating means for moving said movable insert member to vary the extent of insertion of said member in the interior of said cylinder, means for measuring the output temperature of said extrudate, and a processor having an input connected with said mans for measuring the output temperature of said extrudate and an output connected to said actuating means for moving said movable insert member to vary the degree of insertion of said member into the interior of said cylinder, said process comprising the steps of driving said screw of said extruder at a selected constant speed to maintain constant the output quantity of extrudate per unit time, maintaining the degree of insertion of at least one of said insert members constant, during rotation of said screw at said selected speed, in order to effect a predetermined degree of plastification and homogenization of said extrudate, measuring the output temperature of said extrudate with said temperature measuring means, transmitting the measured output temperature of said extrudate to said processor and transmitting a control signal from said process to said actuating means for varying the degree of insertion of said movable insert member in the interior of said cylinder to maintain the output temperature of said extrudate constant.

2. A process according to claim 1, in which said movable insert member is rotatable and in which said control signal from said processor effects rotation of said movable insert member.

3. A process according to claim 1 in which said movable insert member is inserted into said cylinder tangentially to said screw of said extruder and in which said control signal from said processor effects movement of said movable insert member tangentially to said screw of said extruder.

4. A screw extruder for extruding plastic compositions with independent control of the degree of plastification and homogenization of said composition, the output temperature of the composition and the output quantity per unit time, said extruder comprising a cylinder having a cylindrical wall, an extrusion head, a screw rotatable in said cylinder, a motor for driving said screw in rotation in said cylinder to force extrudate to and through said extrusion head and means for controlling the speed of said motor, said screw having a helical flight with at least one annular interruption therein, a plurality of insert members insertable through said wall of said cylinder and into the interior of said cylinder at a location of said annular interruption in said flight of said screw, at least one of said insert members being stationary and at least one of said insert members being movable to vary the degree of insertion of said movable insert member in the interior of said cylinder, actuating means for moving said movable insert member to vary the extent of its insertion into said cylinders, temperature measuring means for measuring the output temperature of said extrudate, a processor having an input connected with said temperature measuring means for measuring the output temperature of said extrudate, an output connected with said means for controlling said speed of said motor and an output connected with said actuating means for moving said movable insert member to vary the extent of insertion of said movable insert member into the interior of said cylinder, said processor controlling the speed of said motor to maintain constant the output quantity per unit time and controlling said movable insert member to vary the insertion of said member into the interior of said cylinder to control output temperature of said extrudate while maintaining stationary at least one of said insert members to effect to predetermined degree of plastification and homogenization of said composition.

5. A screw extruder according to claim 4, further comprising a cylindrical bushing in said cylinder, said bushing and said cylinder having aligned radial holes through which said insert members extend, said holes in said bushing being of a diameter to fit closely said insert members and said holes in said cylinder being of a larger diameter to provide for thermal expansion.

6. A screw extruder according to claim 4 in which there are a plurality of movable insert members and a plurality of stationary insert members, said movable insert members and said stationary insert members being disposed in a common radial plane.

7. A screw extruder according to claim 4, in which there are a plurality of movable insert members, each of said movable insert members comprising a disc which is pivotally movable about a fixed pivot to vary the extent of insertions of said disc into said cylinder and in which said actuation means comprises means for moving said discs pivotally about said fixed pivots.

8. A screw extruder according to claim 4 in which there are a plurality of movable insert members, each of said movable insert members comprising a rod extending into said cylinder tangentially to said screw and in which said actuating comprises means for moving said rods tangentially of said screw.

* * * * *